April 4, 1939. R. H. WALLACE ET AL 2,153,287
AXLE HOUSING
Filed Feb. 27, 1936 2 Sheets-Sheet 1
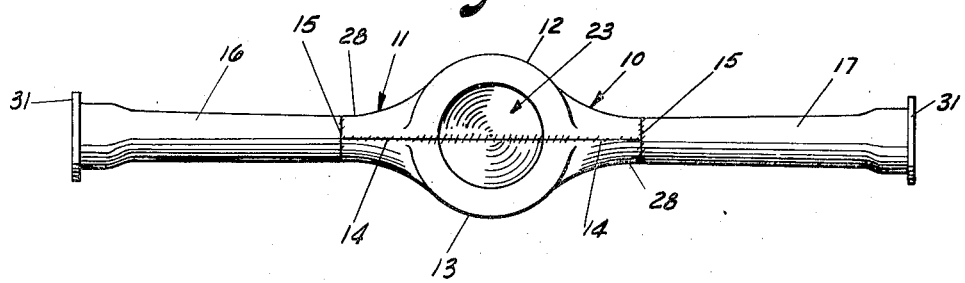
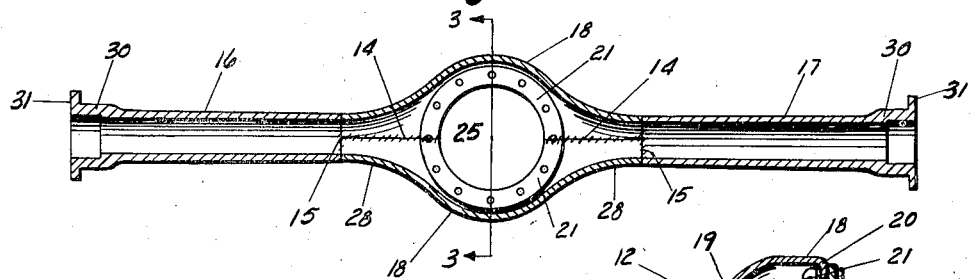
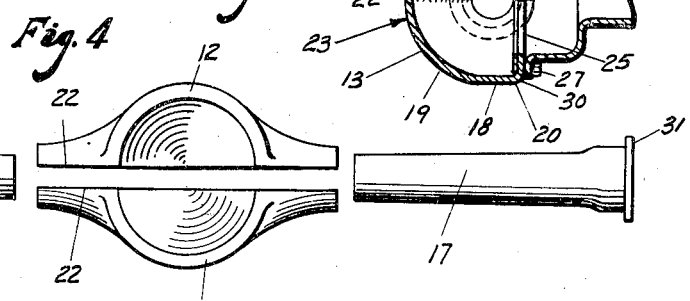
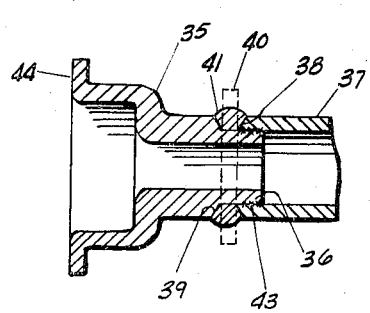
INVENTOR
ROBERT H. WALLACE &
ERNEST RIEMENSCHNEIDER
ATTORNEY

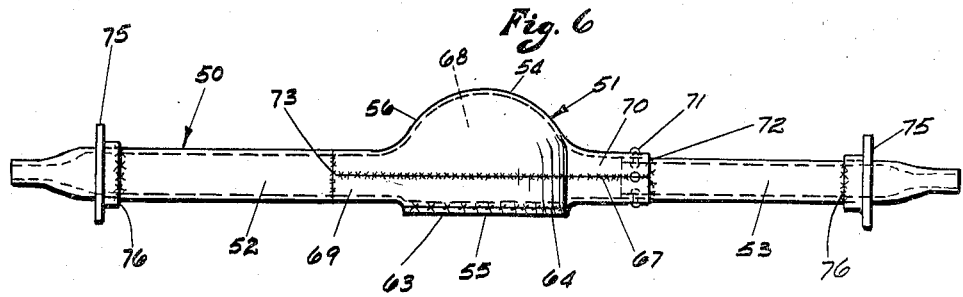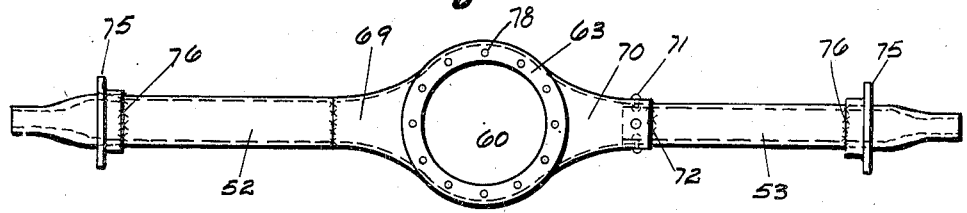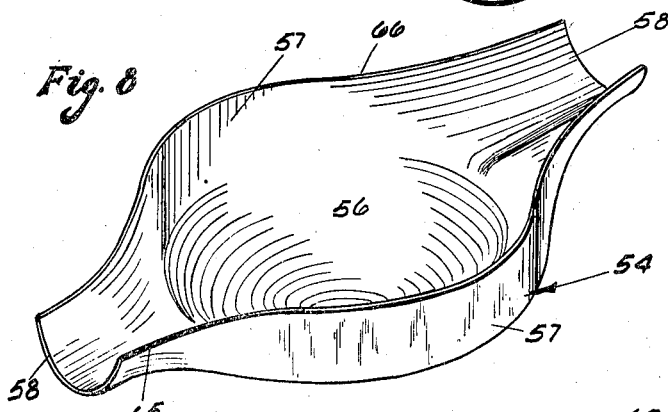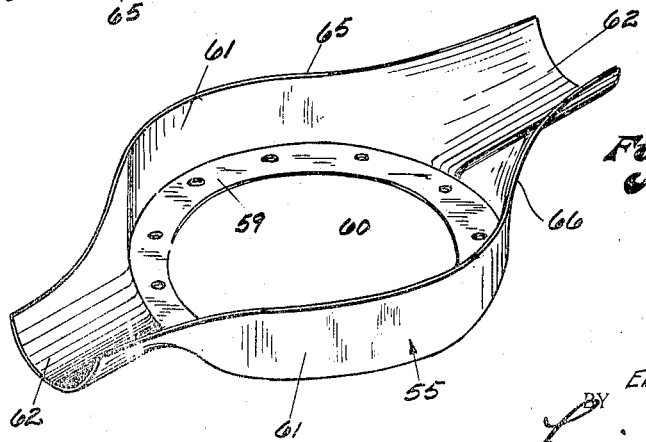

UNITED STATES PATENT OFFICE 2,153,287

AXLE HOUSING

Robert H. Wallace and Ernest Riemenschneider, Lakewood, Ohio, assignors to The Midland Steel Products Company, Cleveland, Ohio, a corporation of Ohio Application February 27, 1936, Serial No. 66,081

3 Claims. (Cl. 74—607)

This invention relates to axle housings for automobiles and has for an object to provide an axle housing formed from the most economical kind of stock.

An important object of our invention is to provide an axle housing composed of small sections, each of which can be machined in inexpensive machinery and can be easily handled.

Another object of the invention is to provide an axle housing having a banjo frame composed of two complementary stampings formed from flat stock and welded together and two axle arms formed from tubular stock and welded to the banjo frame.

A further object of the invention is to provide an axle housing composed of a plurality of elements so sectioned and welded together as to enhance the strength of the axle housing to the extent of making it possible to construct such housings from the lightest and most economical kind of stock.

Another object of the invention is to provide an axle housing wherein access to the differential gears is solely through an opening communicating with a torque tube adapted to be connected to the banjo portion of the axle housing.

A further object of the invention is to form the axle arms in two sections welded together adjacent the wheel support.

Other objects and advantages of the invention will become apparent during the course of the following description.

In the accompanying drawings forming a part of the application and wherein like numerals are employed to designate like parts throughout the several views:

Fig. 1 is a rear elevational view of one embodiment of the invention,

Fig. 2 is a vertical longitudinal sectional view of the embodiment shown in Fig. 1, Fig. 3 is a vertical sectional view corresponding substantially to the line 3—3 of Fig. 2, and also illustrates the axle housing connected to a torque tube, Fig. 4 is an exploded view of the axle housing, Fig. 5 is a fragmentary vertical sectional view of another embodiment of the axle arm, Fig. 6 is a plan view of still another embodiment of our invention, Fig. 7 is a front elevational view of the same, Fig. 8 is a perspective view of a stamped blank forming one-half of the banjo section, and Fig. 9 is a perspective view of a stamped blank forming the other half of the banjo portion of the housing.

Referring to Figures 1 through 4, the numeral 10 designates a rear axle housing comprising a banjo portion 11 made up of two identical half-shell members 12 and 13 stamped and formed from flat stock and welded together along their meeting edges longitudinally of the axle housing, as indicated at 14 and the transverse ends of the half-shell members 12 and 13 are welded as shown at 15, to identically constructed axle arms 16 and 17. These arms are preferably made from tubular welded or seamless stock, since the ends must be thickened and flanged to support the brake apron.

Since the half-shell members 12 and 13 are alike in all respects a description of only one half-shell member is necessary. The upper half shell member 12 is provided with a web section 18, a convex section 19 and an inwardly extending flange 20 which is reinforced by a split ring member 21 herein shown welded to the inner surface of the flange 20.

When the half shell members 12 and 13 are assembled together with their meeting edges 22 in alignment, the convex sections 19 form a dome-shaped member 23 which in conjunction with the web sections 18 provide an enlarged central chamber 24 adapted to accommodate the differential gears of an automobile. The reinforcing split ring sections 21 and flanges 20 cooperate to define a circular front opening 25 which is closed by a torque tube head 26 detachably secured by means of screws 27, or other suitable means to the banjo portion of the axle housing. The half-shell members 12 and 13 taper down at both ends to form tubular end portions 28 which are butt welded transversely to the tubular axle arms 16 and 17, as indicated at 15.

The meeting edges 22 of the half-shell members 12 and 13 are butt or arc welded together on opposite sides of the axle housing in a horizontal plane to constitute an integral construction. It will be noted that the dome-shaped member 23 forms an integral construction spanning the rear portion of the differential chamber 24 to thereby provide a very rigid banjo frame construction adapted to withstand the greatest stresses without the need of employing expensive heavy gauge material or the addition of reinforcing means. Access is had to the gear chamber 24 only by removing the torque tube head 26 from the axle housing.

The outer ends of the axle arms 16 and 17 are thickened by upsetting the tubular stock as indicated at 30, and terminate in annular thickened flanges 31 to which a brake apron may be attached.

From the foregoing it will be perceived that the integral bowed out section 23, at the rear of the banjo member, provides a very rigid axle housing and obviates the welding on of a separate convex hat or cover, thereby effecting a further saving of time and material.

The embodiment of the invention shown in Figure 5 comprises an apron supporting member 35 adapted to be secured to the axle housing described in the foregoing embodiment, and is herein shown having a reduced tubular end 36 telescopically arranged within an end of an axle arm 37 which is provided with a tapered end 38 spaced from a beveled shoulder 39 of the apron support 35 to define a welding groove.

In order to weld the wheel support 35 to the axle arm 37, a metal ring 40 is disposed between the tapered surfaces 38 and 39, the metal ring 40 being initially of the configuration shown in the dotted lines but which during the welding operations is melted down into the wedge shaped annular ring 41 so as to integrate the apron support 35 and axle arm 37 together. The reduced tubular end 36 of the support 35 may also be welded to the interior of the axle arm 37, as shown at 43. This apron support 35 is also provided with an annular flange 44 to which a brake apron is secured.

Referring now to Figures 6 through 9, the numeral 50 designates an axle housing comprising a banjo portion 51 and tubular axle arms 52 and 53. This banjo portion is composed of a rear section 54 and a front section 55. The rear section 54 is stamped from flat stock and formed to provide an integral bowed out portion 56, flanges 57 and reduced semi-circular ends 58. The front section 55 is also stamped from flat stock and is formed to provide an annular depending flange 59 defining an opening 60, flanges 61 and reduced semi-circular ends 62. The annular flange 59 is reinforced by a reinforcing ring 63 herein shown welded at 64 to the outer surface of the flange 59.

The half sections 54 and 55 are joined together by arc or butt welding the meeting edges 65 and 66 in a vertical plane as shown at 67. The assembled half sections define an enlarged central chamber 68 adapted to accommodate the differential gears of an automobile, and also provide tubular extensions 69 and 70.

It will be noted that the bowed out portion 56 of the rear section spans the gear chamber 68 and since the bowed out portion 56 is formed from a single stamping, less costly material and lighter gauge metal may be employed without the addition of reinforcing means. Access is had to the gear chamber 68 only through the opening 60 by removing a torque tube head (not shown) adapted to be detachably secured to the banjo portion by means of screws threaded in the openings 78.

Two methods of securing the axle arms to the banjo portion are herein shown, either one of which may be employed. The axle arm 53 is telescoped within the tubular end 70 of the banjo portion and is secured thereto by rivets 71 and a ring weld 72. If desired only the rivets or ring weld may be employed. As indicated at 73 the axle arm 52 is flash or butt welded to the other tubular end 69 of the banjo. The axle arms 52 and 53 are preferably made from tubular welded or seamless stock, since the ends must be thickened to support the brake aprons 75 which are welded thereto as shown at 76.

It will be perceived that the new and improved axle housing herein described is composed of a banjo frame stamped from flat stock and two tubular axle arms, all of which contribute to reduce the cost of the equipment, labor and the material required to produce the axle housing.

It will be understood that various changes in the size, shape and arrangement of parts may be resorted to without departing from the spirit of the invention or the scope of the appended claims.

We claim:

1. An axle housing composed of a pair of complementary half shell stampings formed from flat stock, one stamping having a dome shaped imperforate bowl intermediate its ends and a pair of oppositely extending arms of semi-circular section arranged in a plane different from that of the base of the bowl portion, the other stamping section having an enlarged intermediate annulus of L-shaped section with oppositely extending arms of semi-circular section arranged in a plane different than the base of the annulus, said half shell stampings tapering outwardly in opposite directions into the arms, said shell and arms being welded together along their meeting edges extending longitudinally of the housing and arranged in a plane parallel to that of the annulus to form a closed dome-shaped banjo portion entirely closed with the exception of the opening provided by the annulus, the semi-circular arms forming tubular extensions from opposite sides of the banjo portion, and tubular axle arms butt-welded to the transverse ends of said tubular extensions, the seams of the last mentioned butt-welds extending at right angles to the seam of the housing, the axle housing being of uniform wall thickness from the banjo portion to and across the said butt-welds.

2. A pressed steel axle housing comprising a pair of complementary half shell stampings, said stampings being formed into substantially U-shaped cross section with an enlarged central part gradually tapering out at each end into a smaller arm of U-section, said stampings being butt-welded together along their longitudinal edges to form a central hollow banjo portion tapering down at opposite sides into short tubular oppositely extending arms with the seam extending longitudinally of the housing, said banjo portion having its rear side extended rearwardly to form a closed dome-shaped extension, and tubular extensions butt-welded to said short tubular arms to complete said housing and to form a pair of welds transversely of the welds securing the two stampings together, the axle housing being of uniform wall thickness from the banjo portion to and across the said butt-welds.

3. A pressed steel axle housing comprising a pair of complementary half shell stampings, said stampings being formed into substantially U-shaped cross section with an enlarged central part gradually tapering out at each end into a smaller arm of U-section, said stampings being butt-welded together along their longitudinal edges in a horizontal plane to form a central hollow banjo portion tapering out at opposite sides into short tubular oppositely extending arms with the seam extending longitudinally of the housing, said stampings forming the banjo portion having their rear sides formed into integral rearwardly convexed portions welded together to form a closed dome-shaped extension, and tubular extensions butt-welded to said short tubular arms to complete said housing and to form welds transversely of the welds securing the two stampings together, the axle housing being of uniform wall thickness from the banjo portion to and across the said butt-welds.

ROBERT H. WALLACE.
ERNEST RIEMENSCHNEIDER.